United States Patent
Fukumoto

(10) Patent No.: US 11,920,030 B2
(45) Date of Patent: Mar. 5, 2024

(54) METHOD FOR PRODUCING POLYHYDROXYALKANOIC ACID

(71) Applicant: KANEKA CORPORATION, Osaka (JP)

(72) Inventor: Asuka Fukumoto, Takasago (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 17/822,835

(22) Filed: Aug. 29, 2022

(65) Prior Publication Data

US 2022/0411629 A1     Dec. 29, 2022

Related U.S. Application Data

(63) Continuation of application No. 16/341,613, filed as application No. PCT/JP2017/037060 on Oct. 12, 2017, now Pat. No. 11,459,455.

(30) Foreign Application Priority Data

Oct. 13, 2016   (JP) .................................. 2016-201997

(51) Int. Cl.
C08L 67/04     (2006.01)
C08G 63/06     (2006.01)
C08J 3/12      (2006.01)

(52) U.S. Cl.
CPC .............. *C08L 67/04* (2013.01); *C08G 63/06* (2013.01); *C08J 3/122* (2013.01); *C08J 2367/04* (2013.01); *C08J 2429/04* (2013.01)

(58) Field of Classification Search
CPC .................................. C08L 67/04; C08L 29/04
See application file for complete search history.

(56) References Cited

U.S. PATENT DOCUMENTS

| | | | |
|---|---|---|---|
| 5,627,276 A | 5/1997 | Greer | |
| 5,945,480 A | 8/1999 | Wang | |
| 5,958,480 A | 9/1999 | Eggink | |
| 6,716,911 B2 | 4/2004 | Doi et al. | |
| 6,867,248 B1 * | 3/2005 | Martin | A61L 27/18 523/124 |
| 9,085,784 B1 | 7/2015 | Herrema | |
| 2002/0068810 A1 | 6/2002 | Whitehouse | |
| 2003/0194443 A1 | 10/2003 | Yano | |
| 2005/0196827 A1 | 9/2005 | Osakada et al. | |
| 2006/0084161 A1 | 4/2006 | Yanagita et al. | |
| 2006/0258833 A1 | 11/2006 | Senda et al. | |
| 2006/0263432 A1 | 11/2006 | Yano | |
| 2007/0088099 A1 | 4/2007 | Mentink et al. | |
| 2009/0155703 A1 | 6/2009 | Sacripante et al. | |
| 2010/0233768 A1 | 9/2010 | Cooper et al. | |
| 2011/0160350 A1 | 6/2011 | Bergman | |
| 2011/0207858 A1 | 8/2011 | Pfaadt | |
| 2013/0225761 A1 | 8/2013 | Whitehouse | |
| 2013/0337516 A1 | 12/2013 | Herrema | |
| 2016/0009914 A1 | 1/2016 | Sobotka et al. | |

FOREIGN PATENT DOCUMENTS

| | | | |
|---|---|---|---|
| CN | 104619748 | | 5/2015 |
| JP | 8-502415 A | | 3/1996 |
| JP | 2005-348640 A | | 12/2005 |
| JP | 2005348640 A | * | 12/2005 |
| JP | 2009-537161 | | 10/2009 |
| WO | WO 2004/041936 | | 5/2004 |
| WO | WO 2004/065608 A1 | | 8/2004 |
| WO | WO 2005/085461 | | 9/2005 |
| WO | WO 2010/067542 A1 | | 6/2010 |

OTHER PUBLICATIONS

Shan et al. (Polymer Degradation and Stability 91, 2006, 3191-3196) (Year: 2006).*
Machine Translation of WO 2010/067542, 2021 (Year: 2021).
Mowiol Polyvinyl Alcohol (Mowiol Polyvinyl Alcohol Manual, 1999) (Year: 1999).
Kopinke et al., Polymer Degradation and Stability 52 1996, 25-38 (Year: 1996).
International Search Report dated Jan. 16, 2018 in PCT/JP2017/037060 filed on Oct. 12, 2017.
KANEKA Biodegradable Polymer PHBH, Grade 1504, BDP001P-EN-05, Safety Data Sheet, Kaneka Corporation, pp. 1-8, Created Sep. 12, 2019, Revised Jul. 29, 2021.
Yu et al, "Estimation of the Porosity of Particle Mixtures by a Linear-Mixture Packing Model", *Ind. Eng. Chem. Res.* 1991, vol. 30, pp. 1372-1385.
Kopinke et al.,"Thermal decomposition of biodegradable polyesters-I: Poly(f)-hydroxybutyric acid", *Polymer Degradation and Stability* 52 1996, 25-38.
Notice of Opposition dated Jun. 17, 2022, in European Patent No. 3527609 16 pages.
"Dichloromethane"—Wikipedia accessed May 20, 2022—5 pages.

* cited by examiner

*Primary Examiner* — Liam J Heincer
(74) *Attorney, Agent, or Firm* — Oblon, McClelland, Maier & Neustadt, L.L.P.

(57) ABSTRACT

An object of the present invention is to provide a method for producing PHA capable of providing PHA (for example, a PHA powder) having excellent thermal stability with high productivity. The present invention is a method for producing polyhydroxyalkanoic acid, the method including a step (a) and a step (b) below step (a) of preparing an aqueous suspension liquid containing polyhydroxyalkanoic acid and polyvinyl alcohol and having a pH of 7 or less; and step (b) of spray-drying the aqueous suspension liquid prepared in the step (a).

19 Claims, No Drawings

US 11,920,030 B2

METHOD FOR PRODUCING POLYHYDROXYALKANOIC ACID

CROSS-REFERENCE TO RELATED APPLICATIONS

The present application is a continuation of U.S. application Ser. No. 16/341,613, filed Apr. 12, 2019, which is a 35 U.S.C. § 371 national stage patent application of International patent application PCT/JP2017/037060, filed on Oct. 12, 2017, which is based on and claims the benefits of priority to Japanese Application No. 2016-201997, filed on Oct. 13, 2016. The entire contents of these applications are incorporated herein by reference.

TECHNICAL FIELD

The present invention relates to a method for producing polyhydroxyalkanoic acid (for example, a powder of polyhydroxyalkanoic acid).

BACKGROUND ART

Polybydroxyalkanoic acid (hereinafter sometimes referred to as "PHA") is a thermoplastic polyester produced and accumulated in cells of many microorganism spices as an energy storage material, and has biodegradability. At present, non-petroleum plastics have attracted attention due to increasing awareness of environmental conservation. In particular, biodegradable plastics such as PHA which are incorporated in material recycling in the natural world and thus the degradation products of which do not become harmful have drawn attention, and to put them into practical applications has been desired. Particularly, since PHA formed and accumulated by microorganisms in cellular bodies is incorporated into the process of carbon cycle of the natural world, lower adverse effects on the ecological system have been expected.

Since PHA produced by a microorganism is usually in the form of a granular body and is accumulated in the cellular bodies of the microorganism, a step of separating and recovering PHA from inside the cellular bodies of the microorganism is necessary for utilizing PHA as a plastic. In addition, for using PHA as a plastic, it is desired to increase the purity of PHA, and to reduce the content of contaminants of constitutive components and the like of cellular bodies as much as possible.

As a method for degradation and/or removal of biological components other than PHA, a method in which biological components other tan PHA are solubilized and removed by a physical treatment, a chemical treatment or a biological treatment has been proposed. For example, Patent Literature 1 and 2 disclose a method in which a treatment of disrupting cellular bodies of a PHA-containing microorganism and a treatment with a surfactant are combined, a method in which a heat treatment after adding an alkali is followed by carrying out a disruption treatment, and the like. In addition, for example, Patent Literature 3 discloses a method for obtaining PHA in which aqueous suspension liquid of cellular bodies of a microorganism is subjected to a treatment with sodium hypochlorite or an enzyme to solubilize biological components other than PHA.

As a means for recovering PHA from an aqueous suspension liquid obtained after disrupting cellular bodies of a PHA-containing microorganism or solubilizing biological components other than PHA, separating operation such as centrifugation or filtration, or drying operation using a spray dryer, a drum dryer, or the like may be exemplified. However, the drying operation is preferably adopted since the operation is simple. It is known that pH of an aqueous suspension liquid at the time of drying is preferably adjusted to 3 to 7 in order to remarkably reduce coloration upon heating and melting (see Patent Literature 4).

CITATION LIST

Patent Literature

PTL 1: JP-T No. H08-502415
PTL 2: WO 2040-5608
PTL 3: JP-A No. 2005-348640
PTL 4: WO 2010/067542

SUMMARY OF INVENTION

Technical Problem

However, when the pH is adjusted to 3 to 7 and the aqueous suspension liquid is concentrated, the PHA vigorously agglomerates, and the fluidity remarkably decreases, so that it is difficult to dry the aqueous suspension liquid. Although it is effective to lower the concentration of the aqueous suspension liquid in order to prevent such decrease in fluidity, this case causes a disadvantage that the amount of energy required for drying increases.

Thus, an object of the present invention is to provide a method for producing PHA, capable of providing PHA (for example, a PHA powder) having excellent thermal stability with high productivity.

Solution to Problem

The inventors of the present invention have found that PHA having excellent thermal stability can be obtained with high productivity according to a method for producing PHA requiring a specific step as essential, and completed the present invention.

Thus, the present invention provides the following invention.

[1] A method for producing polyhydroxyalkanic acid, the method including a step (a) and a step (b) below:
  a step (a) of preparing an aqueous suspension liquid containing polyhydroxyalkanoic acid and polyvinyl alcohol and having a pH of 7 or less and
  a step (b) of spray-drying the aqueous suspension liquid prepared in the step (a).

[2] The method for producing polyhydroxyalkanoic acid according to [1], in which the polyhydroxyalkanoic acid in the aqueous suspension liquid prepared in the step (a) has a concentration of 30% by weight or more and 65% by weight or less.

[3] The method for producing polyhydroxyalkanoic acid according to [11 or 12], in which the polyvinyl alcohol is polyvinyl alcohol having an average polymerization degree of 200 or more and 24100 or less.

[4] The method for producing polyhydroxyalkanoic acid according to any one of [1] to (3), in which the polyvinyl alcohol is polyvinyl alcohol having a saponification degree of less than 98.5 mol %.

[5] The method for producing polyhydroxyalkanoic acid according to any one of [1] to [4], in which the step (a) includes a step (a1) and a step (a2) below:

a step (a1) of adding polyvinyl alcohol to an aqueous suspension liquid containing polyhydroxyalkanoic acid; and a step (a2) of adjusting a pH of the aqueous suspension liquid containing polyhydroxyalkanoic acid to 7 or less.

[6] The method for producing polyhydroxyalkanoic acid according to [5], in which the step (a2) is carried out after the step (a1).

[7] An aqueous suspension liquid containing polyhydroxyalkanoic acid and polyvinyl alcohol and having a pH of 7 or less.

[8] A method for producing the aqueous suspension liquid according to [7], the method including a step (a1) and a step (a2)below:

a step (a1) of adding polyvinyl alcohol to an aqueous suspension liquid containing polyhydroxyalkanoic acid; and a step (a2) of adjusting a pH of the aqueous suspension liquid containing polyhydroxyalkanoic acid to 7 or less.

A polyhydroxyalkanoic acid powder containing polyhydroxyalkanoic acid and polyvinyl alcohol and having a bulk specific gravity of 0.3 to 0.6 kg/L and an average particle diameter of 10 to 200 μm.

Advantageous Effects of Invention

The present invention includes the abovementioned steps as essential, so that PHA (for example, a PHA powder) having excellent thermal stability can be obtained with high productivity. The present invention can reduce the cost (facility cost, utility) of a drying step, in particular. For example, even when a PHA aqueous suspension liquid has high concentration, the present invention can secure fluidity enough to allow the suspension to be fed to a spray dryer, and therefore, the amount of moisture to be evaporated can be reduced, and it is possible to miniaturize the dryer and to remarkably reduce energy required for drying.

DESCRIPTION OF EMBODIMENTS

A method for producing PHA according to the present invention includes the following step (a) and step (b) as essential steps.

Step (a): preparing an aqueous suspension liquid containing PHA and PVA and having a pH of 7 or less Step (b): spray-drying the aqueous suspension liquid prepared in the step (a)

[Step (a)]

In the step (a) in the method for producing PHA according to the present invention, an aqueous suspension liquid containing PHA and PVA and having a pH of 7 or less is prepared. In the aqueous suspension liquid, PHA is present in a state of being dispersed in an aqueous medium, and PVA is dissolved in the aqueous medium. Hereinafter, an aqueous suspension liquid containing at least PHA may be abbreviated as a PHA aqueous suspension liquid.

(PHA)

PHA in the present invention is a generic term for a polymer constituted with hydroxyalkanoic acid as a monomer unit. The hydroxyalkanoic acid constituting PHA is not particularly limited, and examples thereof include 3-hydroxybutanoic acid, 4-hydroxybutanoic acid, 3-hydroxypropionic acid, 3-hydroxypentanoic acid, 3-hydroxyhexanoic acid, 3-hydroxyheptanoic acid, and 3-hydroxyoctanoic acid. These polymers may be homopolymers or copolymers containing two or more kinds of monomer units, and examples thereof include 3-hydroxybutanoic acid homopolymers such as poly(3-hydroxybutyrate) (PHB) and 3-hydroxybutanoic acid copolymers such as poly-3-hydroxybutyrate-co-3-hydroxyhexanoate (PHBH), poly-3-hydroxybutymte-co-3-hydroxyvaleate (PHBV), poly-3-hydroxybutyrate-co4-hydroxybutyrate, and poly-3-hydroxybutyrate-co-3-hydroxyvalerate-co-3-hydroxyhexanoate (PHBVH). For example, although the composition ratio of each monomer unit constituting a binary copolymer of 3-hydroxybutanoic acid (3HB) and 3-hydroxyhexanoic acid (3HH), i.e., PHBH is not particularly limited, the composition ratio of 3HH unit is 1 to 99 mol %, preferably 1 to 50 mol %, and more preferably 1 to 25 mol % when the sum total of the entire monomer units is 100 mol %. Although the composition ratio of each monomer unit constituting a terary copolymer of 3HB, 3-hydoxypentanoic acid (3HV), and 3HH, i.e., PHBVH is not particularly limited, composition ratios suitably fall within the range of, for example, 3HB unit of 1 to 95 mol %, 3HV unit of 1 to 96 mol %, and 3HH unit of 1 to 30 mol %, respectively, when the sum total of the entire monomer units is 101) mol %.

The step (a) preferably includes the following step (a1) and step (a2).

Step (a1): adding polyvinyl alcohol to the PHA aqueous suspension liquid

Step (a2): adjusting a pH of the PHA aqueous suspension liquid to 7 or less

Although the order of carrying out the step (a1) and the step (a2) is not particularly limited, from the viewpoint that agglomeration of PHA in the step (a2) is suppressed and an aqueous suspension liquid excellent in dispersion stability of PHA can be obtained, it is preferable to carry out the step (a2) after the step (a1).

Although the PHA aqueous suspension liquid (PHA aqueous suspension liquid containing no PVA) used as a starting material in the step (a) is not particularly limited, for example, the PHA aqueous suspension liquid can be obtained by a method including a culture step of culturing a microorganism having an ability to intracellularly produce PHA and a purification step of degrading and/or removing a substance other than PHA after the culture step. The method for producing PHA according to the present invention may include a step of producing a PHA aqueous suspension liquid (PHA aqueous suspension liquid containing no PVA) prior to the step (a) (for example, a step including the above-mentioned culture step and purification step). The microorganism used in the relevant step is not particularly limited as long as it is a microorganism that intracellularly produces PHA. For example, a microorganism isolated from natural sources, a microorganism deposited with Microorganism Depositary (for example, IFO, ATCC, etc.), a variant or a transformant which can be prepared therefrom, or the like may be used. More specifically, for example, bacteria of genus *Cupriavidus*, genus *Alcaligenes*, genus *Ralstonia*, genus *Pseudomonas*, genus *Bacillus*, genus *Azotobacter*, genus *Nocardia*, and genus *Aeromonas*, and the like may be involved. Of these, a microorganism belonging to genus *Aeromonas*, genus *Alcaligenes*, genus *Ralstonia*, or genus *Cupriavidus* is preferred. In particular, a strain of *Alcaligenes Lipolytica* (*A. lipolytica*), *Alcaligenes Latus* (*A. latus*), *Aeromonas Caviae* (*A. caviae*), *Aeromonas Hydrophila* (*A. hydrophila*), *Cupriavidus necator* (*C. necator*) or the like is more preferred, and *Cupriavidus necator* is most preferred. Also, when the microorganism does not originally have an ability to produce PHA or produces only a small amount of PHA, a synthase gene of intended PHA and/or a variant thereof may be introduced into the microorganism, and the resulting transformant may be used. Although the synthase gene of PHA which may be used in producing such a transformant is not particularly limited, a PHA synthase gene derived from *Aeromonas caviae* is preferred. By culturing these microorganisms under appropriate conditions, cellular bodies of a microorganism including PHA accumulated in cellular bodies can be obtained. Although a process of culturing the cellular bodies of the microorganism is not particularly limited, for example, a process disclosed in JP-A No. H05-93049 or the like may be used.

A PHA-containing microorganism prepared by culturing the above-mentioned microorganism contains a large amount of bacteria-derived components as impurities, so that in general, a purification step of degrading and/or removing impurities other than PHA may be carried out. In this purification step, physical treatments and/or chemical treatments and/or biological treatments conceivable by those skilled in the art can be applied without particular limitation, and, for example, the purification method described in WO2010/067543 can be preferably applied.

Since the amount of impurities remaining in a final product is largely determined by the purification step described above, it is preferable to reduce these impurities as much as possible. Of course, depending on the application, impurities may be mixed as long as the physical properties of the final product are not impaired however, when high-purity PHA for medical use or the like is required, it is preferable to reduce impurities as much as possible. As an indicator of the degree of purification, it can be expressed by the content of protein in the PHA aqueous suspension liquid. The content of protein is preferably 310000 ppm or less, more preferably 15000 ppm or less, further preferably 10000 ppm or less, most preferably 7500 ppm or less, per weight of PHA. The purification means is not particularly limited, and the above-mentioned publicly-known methods can be applied.

A solvent (aqueous medium) constituting the PHA aqueous suspension liquid in the method for producing PHA according to the present invention may contain water or a mixed solvent of water and organic solvents. The concentration of the organic solvent that is miscible with water in the mixed solvent is not particularly limited as long as it is not more than the solubility of the organic solvent used in water. Furthermore, although the organic solvent that is miscible with water is not particularly limited, for example, alcohols such as methanol, ethanol, 1-propanol, 2-propanol, 1-butanol, 2-butanol, iso-butanol, pentanol, hexanol and heptanol, ketones such as acetone and methyl ethyl ketone, ethers such as tetrahydrofuran and dioxane, nitriles such as acetonitrile and propionitrile, amides such as dimethylformamide and acetamide, dimethyl sulfoxide, pyridine, piperidine, and the like may be exemplified. Among these, methanol, ethanol, 1-propanol, 2-propanol, 1-butanol, 2-butanol, iso-butanol, acetone, methyl ethyl ketone, tetrahydrofuran, dioxane, acetonitrile, propionitrile and the like are suited in view of favorable removability. Still further, methanol, ethanol, 1-propanol, 2-propanol, butanol, acetone and the like are more preferred in view of favorable availability. Methanol, ethanol and acetone are particularly preferred. It should be noted that other solvent and/or components derived from the cellular bodies and compounds generated during purification may be contained as long as essential features of the present invention are not impaired.

The aqueous medium constituting the PHA aqueous suspension liquid in the method for producing PHA according to the present invention preferably contains water. The content of water in the aqueous medium is preferably 5% by weight or more, more preferably 10% by weight or more, further preferably 30% by weight or more, and particularly preferably 50% by weight or more.

The polyvinyl alcohol used in the step (a) (particularly, the step (a1)) of the method for producing PHA according to the present invention is not particularly limited, and, for example, a commercially available product can be used. The polyvinyl alcohol has an average polymerization degree of preferably 200 or more, more preferably 300 or more, and further preferably 500 or more. Meanwhile, the upper limit of the average polymerization degree of the polyvinyl alcohol is preferably 2400 or less, and more preferably 2000 or less. By setting the average polymerization degree to 200 or more, the dispersion stability of PHA in the PHA aqueous suspension liquid is further improved, and there is a tendency that spray drying can be performed more efficiently. On the other hand, by setting the average polymerization degree to 2400 or less, the dispersion stability of PHA in the PHA aqueous suspension liquid is further improved, and there is a tendency that spray drying can be performed more efficiently.

The polyvinyl alcohol used in the step (a) (particularly, the step (a1)) of the method for producing PHA according to the present invention has a saponification degree of preferably 35 mol % or more, more preferably 50 mol % or more, and further preferably 8 mol % or more. The saponification degree is preferably 99.9 mol % or less, more preferably less than 98.5 mol %, and further preferably 95 mol % or less. By setting the saponification degree to 35 mol % or more or and 999 mol % or less, the dispersion stability of PHA in the PHA aqueous suspension liquid is further improved, and there is a tendency that spray drying can be performed more efficiently.

Although the amount of the polyvinyl alcohol to be added to the PHA aqueous suspension liquid in the step (a) (particularly, the step (a1)) of the method for producing PHA according to the present invention is not particularly limited, the amount of the polyvinyl alcohol is preferably 0.1 to 20 parts by weight, more preferably 0.5 to 10 parts by weight, and further preferably 0.75 to 5 parts by weight based on 100 parts by weight of PHA contained in the aqueous suspension liquid. By setting the addition amount of the polyvinyl alcohol to 0.1 parts by weight or more, the dispersion stability of PHA in the PHA aqueous suspension liquid is further improved, and there is a tendency that spray drying can be performed more efficiently. On the other hand, by setting the addition amount to 20 parts by weight or less, the dispersion stability of PHA in the PHA aqueous suspension liquid is further improved, and there is a tendency that spray drying can be performed more efficiently.

Although the PHA aqueous suspension liquid (PHA aqueous suspension liquid before adding PVA) prior to being subjected to the step (a) of the method for producing PHA according to the present invention usually has a pH of more than 7 through the above-mentioned purification step, the pH of the PHA aqueous suspension liquid is adjusted to 7 or less by the step (a) (particularly, the step (a2)) of the method for producing PHA according to the present invention. The adjustment method is not particularly limited, and, for example, a method of adding acid may be mentioned. The acid is not particularly limited and may be either an organic acid or an inorganic acid, and may or may not have volatility. For example, any of sulfuric acid, hydrochloric acid, phosphoric acid, acetic acid and the like can be used. The upper limit of the pH of the PHA aqueous suspension liquid to be adjusted in this step is 7 or less, preferably 5 or less, and more preferably 4 or less from the viewpoint of reducing coloration when PHA is heated and melted and ensuring stability of the molecular weight during heating and/or drying. The lower limit of the pH is preferably 1 or more, more preferably 2 or more, and further preferably 3 or more from the viewpoint of acid resistance of containers. By adjusting the pH of the PHA aqueous suspension liquid to 7 or less, coloration upon heating and melting is reduced, and PHA in which decrease in molecular weight during heating and/or drying is suppressed is obtained.

The concentration of PHA in the PHA aqueous suspension liquid obtained by the step (a) of the method for producing PHA according to the present invention is preferably 30% by weight or more, more preferably 40% by weight or more, and further preferably 50% by weight or more because of economical advantage from drying utility and improvement in productivity. The concentration of PHA is preferably 65% by weight or less, and more preferably 60% by weight or less because there is a possibility that close picking is achieved and satisfactory fluidity cannot be secured. A method of adjusting the concentration of PHA is not particularly limited, and examples thereof include adding an aqueous medium or removing a portion of the aqueous medium (for example, according to a method of centrifuging and then removing a supernatant). The concentration of PHA may be adjusted at any stage of the step (a) or before the step (a).

PHA in the PHA aqueous suspension liquid obtained by the step (a) of the method for producing PHA according to the present invention has a volume average particle diameter of preferably 50 times or less, more preferably 20 times or less, and further preferably 10 times or less the volume average particle diameter of primary particles of the PHA (sometimes referred to as "primary particle diameter"). When the volume average particle diameter of PHA in the PHA aqueous suspension liquid is 50 times or less the primary particle diameter, the PHA aqueous suspension liquid exhibits more excellent fluidity, so that the subsequent step (b) can be carried out with high efficiency and the productivity of PHA tends to be further improved. The above-mentioned volume average particle diameter of PHA can be used as an index of a dispersion state of PHA in the PHA aqueous suspension liquid. A method of adjusting the volume average particle diameter is not particularly limited, and any known means (for example, stirring) can be applied. For example, a PHA aqueous suspension liquid in which the dispersion state has collapsed due to exposure under acidic conditions or the like (for example, the case where the step (a2) is carried out before the step (a1)) is subjected to physical treatment and/or chemical treatment and/or biological treatment conceivable by those skilled in the art, and PHA in the PHA aqueous suspension liquid can be returned to the dispersion state again (for example, a state having the above-mentioned volume average particle diameter).

[Step (b)]

In the step (b) of the method for producing PHA according to the present invention, the PHA aqueous suspension liquid prepared in the step (a) is spray-dried. As a spray-drying method, for example, a method in which the PHA aqueous suspension liquid in a line droplet state is supplied into a dryer and dried while being brought into contact with hot air in the dryer may be mentioned. There is no particular limitation on the method (atomizer) of supplying the PHA aqueous suspension liquid in a fine droplet state into the dryer, and publicly known methods such as a method using a rotating disk and a method using a nozzle may be mentioned. There is no particular limitation on the method of bringing droplets into contact with hot air in the dryer, and cocurrent type, countercurrent type, combined use of these types, and the like may be used without particular limitation.

The drying temperature in the spray-drying in the step (b) may be any temperature as long as the majority of the aqueous medium can be removed from the droplets of the PHA aqueous suspension liquid, and the drying can be carried out to the moisture content of interest. In addition, the drying temperature can be appropriately set under conditions that do not cause quality deterioration (decrease in molecular weight, decrease in color tone) and melting as much as possible. For example, the temperature of hot air blow into the spray dryer can be appropriately selected within the range of 100 to 300° C. The amount of hot air in the dryer can also be appropriately set in accordance with, for example, the size of the dryer.

The method for producing PHA according to the present invention may include a step of further drying the resultant PHA (such as a PHA powder) (for example, a step of subjecting PHA to reduced-pressure drying) after the step (b). Further, the method for producing PHA according to the present invention may include other steps (for example, a step of adding various additives to the PHA aqueous suspension liquid).

The method for producing PHA according to the present invention can provide PHA in a dry state with high productivity and excellent thermal stability. The method for producing PHA according to the present invention can reduce the cost (facility cost, utility) of the drying step, in particular. Further, the method for producing PHA according to the present invention can provide PHA in the form of a powder (PHA powder), so that PHA excellent in handleability can be obtained with high efficiency.

Although not particularly limited, a PHA powder obtained by the method for producing PHA according to the present invention has a bulk specific gravity of preferably 0.3 to 0.6 kg/L, and more preferably 0.4 to 0.6 kg/L, from the viewpoint of achieving excellent fluidity. Although not particularly limited, the PHA powder has a sphericity of preferably 0.90 to 1.00, and mom preferably 0.93 to 1.00, from the viewpoint of achieving excellent fluidity. In addition, although not particularly limited, the PHA powder has an average particle diameter of preferably 10 to 200 μm, and more preferably 100 to 150 μm, from the viewpoint of achieving excellent fluidity.

The PHA powder of the present invention may contain the above-mentioned polyvinyl alcohol. Although not particularly limited, the content of the polyvinyl alcohol is preferably 0.1 to 20 parts by weight, more preferably 0.5 to 10 parts by weight, and further preferably 0.75 to 5 parts by weight based on 100 parts by weight of PHA constituting the PHA powder. By setting the addition amount of the polyvinyl alcohol to the above range, the productivity of the PHA powder further tends to be improved.

EXAMPLES

Hereinafter, the present invention is explained in more detail by way of Examples in the following, but the present invention is not limited only to these Examples.

(Method of Calculating Content of Protein (Per PHA Weight) in PHA Aqueous Suspension Liquid)

The entirety of a solvent in the PHA aqueous suspension liquid obtained in each of the following Examples and Comparative Examples was evaporated to obtain a residual solid content. The solid content was placed in a centrifuge tube and then added with BCA Protein Assay Reagent from Thermo Fisher Scientific Inc., which was shaken by hand from time to time and immersed in a warm bath at 60° C. for 30 minutes while mixing the contents. Thereafter, the resultant content was allowed to pass through a 0.5 μm filter, and the absorbance at 562 nm was measured for the resultant liquid using a spectrophotometer (UV-1700) manufactured by Shimadzu Corporation. By comparing the absorbance with a calibration curve prepared using an albumin standard solution, the content of protein remaining in the solid content was calculated. The content of protein per weight of the solid content was defined as the content of protein (per weight of PHA) remaining in the PHA aqueous suspension liquid.

(Method of Evaluating Thermal Stability of PHA Powder)

As a sample for evaluation, a PHA powder obtained in each of the following Examples and Comparative Examples was used. The PHA powder was heated at 160° C. for 20 minutes to prepare a PHA sheet. Ten mg of the PHA sheet was dissolved in 10 ml of chloroform, and then an insoluble matter was removed by filtration. The molecular weight of the solution (filtrate) was determined using a GPC system manufactured by Shimadzu Corporation equipped with "Shodex K805L (30×8 mm, 2 columns-connected)" (product of Showa Denko K.K.) with chloroform as a mobile phase. As the molecular weight standard sample, commercially available standard polystyrene was used. The molecular weight of the PHA powder was also determined by the same procedure except that no PHA sheet was prepared.

The thermal stability was evaluated by using as an index the molecular weight reduction rate (weight average molecular weight of PHA sheet weight average molecular weight of PHA powder×100) obtained by applying heat at 160° C. for 20 minutes as described above. When the molecular weight reduction rate was 70% or more, it was judged that the thermal stability was good. When the molecular weight reduction rate was less than 70%, it was judged that the thermal stability was poor.

In Comparative Examples 1 and 3, spray-drying could not be carried out and a sample for evaluation (PHA powder) could not be obtained, so that the thermal stability was not evaluated.

(Method of Evaluating Propriety of Spray-Drying)

A PHA aqueous suspension liquid obtained in each of the following Examples and Comparative Examples was fed to an atomizer using a Mobile Minor 2000 (chamber diameter: 800 mm, straight body height: 600 mm) spray dryer manufactured by Niro, and it was judged whether the suspension was sprayable. A case where spray-drying was possible without agglomeration was evaluated as very good, a case where spray-drying was possible even when agglomeration occurred was evaluated as good, and a case where spray-drying was impossible due to aggregation was evaluated as poor. The case of good or very good was regarded as acceptable, (Measurement of Bulk Density)

By the method described in JIS K-7365, measurement was performed using a device in which a funnel having a lower opening of 20 mm to 30 mm and being attached with a damper (for example, a metal plate) was set in an upper portion of a metal cylinder (receiver) having a volume of 100 ml±0.5 ml and an inner diameter of 45 mm±5 mm and having a smoothly finished inner surface. A scale that could measure up to a precision of 0.1 g was used.

As a specific measurement method, the funnel and the axis of the cylinder were held vertically so as to coincide with each other. Powders were thoroughly mixed prior to testing. The damper at the lower opening of the funnel was closed and charged with 110 ml to 120 ml of powders. The damper was immediately removed, and the material was flowed down into the receiver. When the receiver was full, the material raised from the receiver was scraped off with a linear plate. The mass of the contents of the receiver was weighed up to a precision of 0.1 g using a scale. Two measurements were performed on powders to be tested.

An apparent bulk density (unit: g/ml) of the material tested was calculated by the following formula.

$$m/V$$

where m represents the mass (g) of the contents of the receiver, and V represents the volume (ml) (i.e., 100) of the receiver. The arithmetic mean value of the results of the two measurements was taken as the result (Average Particle Diameter)

An average particle diameter was measured using a laser diffraction/scattering particle diameter distribution measuring apparatus LA-950 (HORIBA. Ltd.). As a specific measurement method, 0.05 g of surfactant sodium dodecyl sulfate was added as a dispersant to 20 mL of ion-exchanged water to obtain an aqueous surfactant solution. Thereafter, 0.2 g of a resin particle group to be measured was added to the above aqueous surfactant solution, and the resin particle group was dispersed in the aqueous surfactant solution to obtain a dispersion for measurement. The dispersion thus prepared was introduced into the laser diffraction/scattering particle diameter distribution measuring apparatus, and measurement was carried out.

Example 1

[Preparation of Cell Culture Liquid]

*Ralstonia eutropha* KNK405 strain disclosed in paragraph No. 100491 of WO 200810296 was cultured according to the process disclosed in paragraph Nos. [0050]-[0053] of the same document to obtain a cell culture liquid including cellular bodies containing PHA. Note that *Ralstonia eutropha* is classified as *Cupriavidus necator* at present.

[Sterilization Treatment]

The obtained cell culture liquid was subjected to a treatment of heating with stirring at an internal temperature of 60 to 80° C. for 20 minutes to execute a sterilization treatment.

[High-Pressure Disruption Treatment]

To the obtained sterilized cell culture liquid was added 0.2% by weight sodium dodecyl sulfate. Furthermore, after adding an aqueous sodium hydroxide solution such that the pH became 11.0, the mixture was incubated at 50° C. for 1 hour. Thereafter, disruption at high pressure was carried out with a high-pressure disrupting machine (high-pressure homogenier model PA2K manufactured by Niro Soavi S.P.A) at a pressure of 450 to 550 kgf/cm$^2$.

[Purification Treatment]

To the obtained disruption liquid after subjecting to disruption at high pressure was added an equal amount of distilled water. The disruption liquid was subjected to centrifugation, and the supernatant was removed, followed by 2-fold concentration. To the concentrated aqueous suspension liquid of PHA was added an aqueous sodium hydroxide solution (pH 11) in an amount equal to the removed supernatant, followed by centrifugation. After the supernatant was removed, water was added again, followed by suspension. Thereto were added 0.2% by weight sodium dodecyl sulfate and a protease in a weight of $1/100$ the PHA (manufactured by Novozymes A/S, Esperase), and the mixture was stirred for 2 hours while maintaining the pH of 10 at 50° C. Thereafter, the supernatant was removed by centrifugation, and the liquid was 4-fold concentrated. Water was further added to adjust the PHA concentration to 31% by weight. The content of protein remaining in the PHA aqueous suspension liquid thus obtained was measured and found to be 5490 ppm per weight of PHA.

To the obtained PHA aqueous suspension liquid (solid content concentration: 31%) was added 2.5 phr (2.5 parts by weight based on 100 parts by weight of PHA present in the aqueous suspension liquid) of polyvinyl alcohol (trade name: Poval) having an average polymerization degree of 500 and a saponification degree of 80 mol % shown in Table 1, and then the solid content concentration was adjusted to 30%. After stirring this solution for 30 minutes, sulfuric acid was added, and the pH was adjusted until the pH was stabilized to 4. The PHA aqueous suspension liquid thus obtained was fed to an atomizer using a Mobile Minor 2000 spray dryer manufactured by Niro, and spray-drying was performed (hot air temperature: 150° C., exhaust air temperature: 70° C.). The thermal stability of the PHA powder obtained by spray-drying was confirmed by the above method.

Example 2

A PHA aqueous suspension liquid having a solid content concentration of 31% was prepared by the same operation as in Example 1 until the purification treatment. Then, to the aqueous suspension liquid was added 2.5 phr (2.5 parts by weight based on 100 parts by weight of PHA present in the aqueous suspension liquid) of polyvinyl alcohol (trade name: Poval) having an average polymerization degree of 500 and a saponification degree of 85 mol % shown in Table 1, and then the solid content concentration was adjusted to 30%. After stirring this solution for 30 minutes, sulfuric acid was added, and the pH was adjusted until the pH was stabilized to 4. The PHA aqueous suspension liquid thus obtained was fed to an atomizer using a Mobile Minor 2000 spray dryer manufactured by Niro, and spray-drying was performed. The thermal stability of the PHA powder obtained by spray-drying was confirmed by the above method.

Example 3

A PHA aqueous suspension liquid having a solid content concentration of 31% was prepared by the same operation as in Example 1 until the purification treatment. Then, to the aqueous suspension liquid was added 2.5 phr (2.5 parts by weight based on 100 parts by weight of PHA present in the aqueous suspension liquid) of polyvinyl alcohol (trade name: Poval) having an average polymerization degree of 500 and a saponification degree of 88 mol % shown in Table 1, and then the solid content concentration was adjusted to 30%. After stirring this solution for 30 minutes, sulfuric acid was added, and the pH was adjusted until the pH was stabilized to 4. The PHA aqueous suspension liquid thus obtained was fed to an atomizer using a Mobile Minor 2000 spray dryer manufactured by Niro. and spray-drying was performed. The thermal stability of the PHA powder obtained by spray-drying was confirmed by the above method. The obtained PHA powder had an average particle diameter of 92 μm and a bulk density of 0.32 g/ml.

Example 4

A PHA aqueous suspension liquid having a solid content concentration of 31% was prepared by the same operation as in Example 1 until the purification treatment. Then, to the aqueous suspension liquid was added 2.5 phr (2.5 parts by weight based on 100 parts by weight of PHA present in the aqueous suspension liquid) of polyvinyl alcohol (trade name: Poval) having an average polymerization degree of 2000 and a saponification degree of 80 mol % shown in Table 1, and then the solid content concentration was adjusted to 30%. After stirring this solution for 30 minutes, sulfuric acid was added, and the pH was adjusted until the pH was stabilized to 4. The PHA aqueous suspension liquid thus obtained was fed to an atomizer using a Mobile Minor 2000 spray dryer manufactured by Niro, and spray-drying was performed. The thermal stability of the PHA powder obtained by spray-drying was confirmed by the above method.

Example 5

A PHA aqueous suspension liquid having a solid content concentration of 31% was prepared by the same operation as in Example 1 until the purification treatment. Then, to the aqueous suspension liquid was added 2.5 phr (2.5 pans by weight based on 100 parts by weight of PHA present in the aqueous suspension liquid) of polyvinyl alcohol (trade name: Poval) having an average polymerization degree of 2400 and a saponification degree of 80 mol % shown in Table 1, and then the solid content concentration was adjusted to 30%. After stirring this solution for 30 minutes sulfuric acid was added, and the pH was adjusted until the pH was stabilized to 4. The PHA aqueous suspension liquid thus obtained was fed to an atomizer using a Mobile Minor 2000 spray dryer manufactured by Niro. and spray-drying was performed. The thermal stability of the PHA powder obtained by spray-drying was confirmed by the above method.

Comparative Example 1

A PHA aqueous suspension liquid having a solid content concentration of 31% was prepared by the same operation as in Example 1 until the purification treatment. Then, to the aqueous suspension liquid was added water, and the solid content concentration was set to 30%. After stirring this solution for 30 minutes, sulfuric acid was added, and the pH was adjusted until the pH was stabilized to 4. The PHA aqueous suspension liquid thus obtained was fed to an atomizer using a Mobile Minor 2000 spray dryer manufactured by Niro, and when whether spray-drying was possible was confirmed, it was impossible.

Comparative Example 2

A PHA aqueous suspension liquid having a solid content concentration of 31% was prepared by the same operation as in Example 1 until the purification treatment. Then, to the aqueous suspension liquid was added water, and the solid content concentration was set to 30%. After stirring this solution for 30 minutes, an aqueous sodium hydroxide solution was added, and the pH was adjusted until the pH was stabilized to 11. The PHA aqueous suspension liquid thus obtained was fed to an atomizer using a Mobile Minor 2000 spay dryer manufactured by Niro, and spray-drying was performed. The thermal stability of the PHA powder obtained by spray-drying was confirmed.

Example 6

A cell culture liquid was prepared by the same operation as in Example 1 until the sterilization treatment. To the obtained sterilized cell culture liquid was added 0.2% by weight sodium dodecyl sulfate. Furthermore, after adding an aqueous sodium hydroxide solution such that the pH became 11.0, the mixture was incubated at 50° C. for 1 hour. Thereafter, disruption treatment at high pressure was carried out with a high-pressure disrupting machine (high-pressure homogenizer model PA2K manufactured by Niro Soavi SPA) at a pressure of 450 to 550 kg/cm$^2$.

Next, to the obtained disruption liquid after subjecting to disruption at high pressure was added an equal amount of distilled water. Thereafter, the disruption liquid was subjected to centrifugation, and the supernatant was removed, followed by 2-fold concentration. Thereto was added an aqueous sodium hydroxide solution (pH 11) in an amount equal to the removed supernatant, followed by centrifugation. After the supernatant was eliminated, water was added again, followed by suspension. Thereto were added 0.2% by weight sodium dodecyl sulfate and a protease in a weight of 1/100 the PHA (manufactured by Novozymes A/S, Esperase), and the mixture was stirred for 2 hours while maintaining the pH of 10 at 50° C. Thereafter, the supernatant was eliminated by centrifugation, and the liquid was 16-fold concentrated. Water was added thereto to adjust the PHA concentration to 53% by weight. The content of protein remaining in the obtained PHA aqueous suspension liquid was found to be 1030 ppm per weight of PHA.

To the obtained PHA aqueous suspension liquid (solid content concentration: 53%) was added 0.75 phr (0.75 parts by weight based on 100 parts by weight of PHA present in the aqueous suspension liquid) of polyvinyl alcohol (trade name: Poval) having an average polymerization degree of 500 and a saponification degree of 88 mol % shown in Table 1, and the solid content concentration was adjusted to 50%. After stirring this solution for 30 minutes, sulfuric acid was added, and the pH was adjusted until the pH was stabilized to 4. The PHA aqueous suspension liquid thus obtained was fed to an atomizer using a Mobile Minor spray dryer manufactured by Niro, and spray-drying was performed. The thermal stability of the PHA powder obtained by spray-drying was confirmed by the above method.

Example 7

A PHA aqueous suspension liquid having a solid content concentration of 53% was prepared in the same manner as in Example 6, and to the aqueous suspension liquid was added 1 phr (1 part by weight based on 100 parts by weight of PHA present in the aqueous suspension liquid) of polyvinyl alcohol (trade name: Poval) having an average polymerization degree of 50K and a saponification degree of 88 mol % shown in Table 1, and the solid content concentration was adjusted to 50%. After stirring this solution for 30 minutes, sulfuric acid was added, and the pH was adjusted until the pH was stabilized to 4. The PHA aqueous suspension liquid thus obtained was fed to an atomizer using a Mobile Minor spray dryer manufactured by Niro, and spray-drying was performed. The thermal stability of the PHA powder obtained by spray-drying was confirmed by the above method.

Example 8

A PHA aqueous suspension liquid having a solid content concentration of 53% was prepared in the same manner as in Example 6, and to the aqueous suspension liquid was added 1.5 phr (1.5 pans by weight based on 100 parts by weight of PHA present in the aqueous suspension liquid) of polyvinyl alcohol (trade name: Poval) having an average polymerization degree of 500 and a saponification degree of 88 mol % shown in Table 1, and the solid content concentration was adjusted to 50%. After stirring this solution for 30 minutes, sulfuric acid was added, and the pH was adjusted until the pH was stabilized to 4. The PHA aqueous suspension liquid thus obtained was fed to an atomizer using a Mobile Minor spray dryer manufactured by Niro, and spray-drying was performed. The thermal stability of the PHA powder obtained by spray-drying was confirmed by the above method.

Example 9

A PHA aqueous suspension liquid having a solid content concentration of 53% was prepared in the same manner as in Example 6, and to the aqueous suspension liquid was added 2.5 phr (2.5 parts by weight based on 100 parts by weight of PHA present in the aqueous suspension liquid) of polyvinyl alcohol (trade name: Poval) having an average polymerization degree of 50 and a saponification degree of 88 mol % shown in Table 1, and the solid content concentration was adjusted to 50%. After stirring this solution for 30 minutes, sulfuric acid was added, and the pH was adjusted until the pH was stabilized to 4. The PHA aqueous suspension liquid thus obtained was fed to an atomizer using a Mobile Minor spray dryer manufactured by Niro, and spray-drying was performed. The thermal stability of the PHA powder obtained by spray-drying was confirmed.

Comparative Example 3

A PHA aqueous suspension liquid having a solid content concentration of 53% was prepared in the same manner as in Example 6, and to the aqueous suspension liquid was added water, and the solid content concentration was adjusted to 50%. After stirring this solution for 30 minutes, sulfuric acid was added, and the pH was adjusted until the pH was stabilized to 4. The PHA aqueous suspension liquid thus obtained was fed to an atomizer using a Mobile Minor spray dryer manufactured by Niro, and when whether spray-drying was possible was confirmed, it was impossible.

Example 10

A cell culture liquid was prepared by the same operation as in Example 1 until the sterilization treatment. To the obtained sterilized cell culture liquid was added 0.2% by weight sodium dodecyl sulfate. Furthermore, after adding an aqueous sodium hydroxide solution such that the pH became 11.0, the mixture was incubated at 50° C. for 1 hour. Thereafter, disruption treatment at high pressure was carried out with a high-pressure disrupting machine (high-pressure homogenizer model PA2K manufactured by Niro Soavi S.P.A) at a pressure of 450 to 550 kgf/cm$^2$.

Next, to the obtained disruptions liquid after subjecting to disruption at high pressure was added an equal amount of distilled water. Thereafter, the disruption liquid was subjected to centrifugation, and the supernatant was removed, followed by 2-fold concentration. Thereto was added an aqueous sodium hydroxide solution (pH 11) in an amount equal to the removed supernatant followed by centrifugation. After the supernatant was eliminated, water was added again, followed by suspension. Thereto were added 0.2% by weight sodium dodecyl sulfate and a protease in a weight of 11100 the PHA (manufactured by Novozymes A/S, Esperase), and the mixture was stirred for 2 hours while maintaining the pH of 10 at 50° C. Thereafter, the supernatant was eliminated by centrifugation, and the liquid was 16-fold concentrated. Water was added thereto to adjust the PHA concentration to 53% by weight. The content of protein remaining in the obtained PHA aqueous suspension liquid was found to be 990 ppm per weight of PHA.

To the obtained PHA aqueous suspension liquid (solid content concentration: 53%) was added 1.5 phr (1.5 parts by weight based on 100 parts by weight of PHA present in the aqueous suspension liquid) of polyvinyl alcohol (trade name: Gohsenol) having an average polymerization degree of 500 and a saponification degree of 43 mol % shown in Table 1, and the solid content concentration was adjusted to 50%, After stirring this solution for 30 minutes sulfuric acid was added, and the pH was adjusted until the pH was stabilized to 4. The PHA aqueous suspension liquid thus obtained was fed to an atomizer using a Mobile Minor spray dryer manufactured by Niro, and spray-drying was performed. The thermal stability of the PHA powder obtained by spray-drying was confirmed by the above method.

Example 11

A PHA aqueous suspension liquid having a solid content concentration of 53% was prepared in the same manner as in Example 10, and to the aqueous suspension liquid was added 1.5 phr (1.5 parts by weight based on 100 parts by weight of PHA present in the aqueous suspension liquid) of polyvinyl alcohol (trade name: Gohsenol) having an average polymerization degree of 500 and a saponification degree of 50 mol % shown in Table 1, and the solid content concentration was adjusted to 50%. After stirring this solution for 30 minutes, sulfuric acid was added, and the pH was adjusted until the pH was stabilized to 4. The PHA aqueous suspension liquid thus obtained was fed to an atomizer using a Mobile Minor spray dryer manufactured by Niro, and spray-drying was performed. The thermal stability of the PHA powder obtained by spray-drying was confirmed by the above method.

Example 12

A PHA aqueous suspension liquid having a solid content concentration of 53% was prepared in the same manner as in Example 10, and to the aqueous suspension liquid was added 1.5 phr (1.5 parts by weight based on 100 parts by weight of PHA present in the aqueous suspension liquid) of polyvinyl alcohol (trade name: Gohsenol) having an average polymerization degree of 500 and a saponification degree of 73 mol % shown in Table 1, and the solid content concentration was adjusted to 50%. After stirring this solution for 30 minutes, sulfuric acid was added, and the pH was adjusted until the pH was stabilized to 4. The PHA aqueous suspension liquid thus obtained was fed to an atomizer using a Mobile Minor spray dryer manufactured by Niro, and spray-drying was performed. The thermal stability of the PHA powder obtained by spray-drying was confirmed by the above method.

Example 13

A PHA aqueous suspension liquid having a solid content concentration of 53% was prepared in the same manner as in Example 10, and to the aqueous suspension liquid was added 1.5 phr (1.5 parts by weight based on 100 parts by weight of PHA present in the aqueous suspension liquid) of polyvinyl alcohol (trade name: Gohsenol) having an average polymerization degree of 500 and a saponification degree of 80 mol % shown in Table 1, and the solid content concentration was adjusted to 50%. After stirring this solution for 30 minutes, sulfuric acid was added, and the pH was adjusted until the pH was stabilized to 4. The PHA aqueous suspension liquid thus obtained was fed to an atomizer using a Mobile Minor spray dryer manufactured by Niro, and spray-drying was performed. The thermal stability of the PHA powder obtained by spray-drying was confirmed by the above method.

Example 14

A PHA aqueous suspension liquid having a solid content concentration of 53% was prepared in the same manner as in Example 10, and to the aqueous suspension liquid was added 1.5 phr 0.5 parts by weight based on 1N) parts by weight of PHA present in the aqueous suspension liquid) of polyvinyl alcohol (trade name: Gohsenol) having an average polymerization degree of 500 and a saponification degree of 87 mol % shown in Table 1, and the solid content concentration was adjusted to 50%. After stirring this solution for 30 minutes, sulfuric acid was added, and the pH was adjusted until the pH was stabilized to 4. The PHA aqueous suspension liquid thus obtained was fed to an atomizer using a Mobile Minor spray dryer manufactured by Niro, and spray-drying was performed. The thermal stability of the PHA powder obtained by spray-drying was confirmed by the above method. The obtained PHA powder had an average particle diameter of 140 μm and a bulk density of 0.4 g/ml.

Example 15

A PHA aqueous suspension liquid having a solid content concentration of 53% was prepared in the same manner as in Example 10, and to the aqueous suspension liquid was added 1.5 phr (15 parts by weight based on 100 parts by weight of PHA present in the aqueous suspension liquid) of polyvinyl alcohol (trade name: Gobsenol) having an average polymerization degree of 400 and a saponification degree of 87 mol % shown in Table 1, and the solid content concentration was adjusted to 50%. After stirring this solution for 30 minutes, sulfuric acid was added, and the pH was adjusted until the pH was stabilized to 4. The PHA aqueous suspension liquid thus obtained was fed to an atomizer using a Mobile Minor spray dryer manufactured by Niro, and spray-drying was performed. The thermal stability of the PHA powder obtained by spray-drying was confirmed by the above method.

Example 16

A PHA aqueous suspension liquid having a solid content concentration of 53% was prepared in the same manner as in Example 10, and to the aqueous suspension liquid was added 1.5 phr (1.5 pans by weight based on 100 parts by weight of PHA present in the aqueous suspension liquid) of polyvinyl alcohol (trade name: Gohsenol) having an average polymerization degree of 600 and a saponification degree of 87 mol % shown in Table 1, and the solid content concentration was adjusted to 50%. After stirring this solution for 30 minutes, sulfuric acid was added, and the pH was adjusted until the pH was stabilized to 4. The PHA aqueous suspension liquid thus obtained was fed to an atomizer using a Mobile Minor spray dryer manufactured by Niro, and spray-drying was performed. The thermal stability of the PHA powder obtained by spray-drying was confirmed by the above method.

Example 17

A PHA aqueous suspension liquid having a solid content concentration of 53% was prepared in the same manner as in Example 10, and to the aqueous suspension liquid was added 1.5 phr (1.5 parts by weight based on 100 parts by weight of PHA present in the aqueous suspension liquid) of polyvinyl alcohol (trade name: Gohsenol) having an average polymerization degree of 1700 and a saponification degree of 87 mol % shown in Table 1, and the solid content concentration was adjusted to 50%. After stirring this solution for 30 minutes, sulfuric acid was added, and the pH was adjusted until the pH was stabilized to 4. The PHA aqueous suspension liquid thus obtained was fed to an atomizer using a Mobile Minor spray dryer manufactured by Niro, and spray-drying was performed. The thermal stability of the PHA powder obtained by spray-drying was confirmed by the above method.

Example 18

A PHA aqueous suspension liquid having a solid content concentration of 53% was prepared in the same manner as in Example 10, and to the aqueous suspension liquid was added 1.5 phr (1.5 pans by weight based on 100 parts by weight of PHA present in the aqueous suspension liquid) of polyvinyl alcohol (trade name: Gohsenol) having an average polymerization degree of 2100 and a saponification degree of 87 mol % shown in Table 1, and the solid content concentration was adjusted to 50%. After stirring this solution for 30 minutes, sulfuric acid was added, and the pH was adjusted until the pH was stabilized to 4. The PHA aqueous suspension liquid thus obtained was fed to an atomizer using a Mobile Minor spray dryer manufactured by Niro, and spray-drying was performed. The thermal stability of the PHA powder obtained by spray-drying was confirmed by the above method.

Example 19

A PHA aqueous suspension liquid having a solid content concentration of 53% was prepared in the same manner as in Example 10, and to the aqueous suspension liquid was added 1.5 phr (1.5 parts by weight based on 100 parts by weight of PHA present in the aqueous suspension liquid) of polyvinyl alcohol (trade name: Gohsenol) having an average polymerization degree of 2400 and a saponification degree of 87 mol % shown in Table 1, and the solid content concentration was adjusted to 50%. After sting this solution for 30 minutes, sulfuric acid was added, and the pH was adjusted until the pH was stabilized to 4. The PHA aqueous suspension liquid thus obtained was fed to an atomizer using a Mobile Minor spray dryer manufactured by Niro, and spray-drying was performed. The thermal stability of the PHA powder obtained by spray-drying was confirmed by the above method.

Example 20

A PHA aqueous suspension liquid having a solid content concentration of 53% was prepared in the same manner as in Example 10, and to the aqueous suspension liquid was added 1.5 phr (1.5 parts by weight based on 11) pats by weight of PHA present in the aqueous suspension liquid) of polyvinyl alcohol (trade name: Gohsenol) having an average polymerization degree of 2600 and a saponification degree of 87 mol % shown in Table 1, and the solid content concentration was adjusted to 50%. After stirring this solution for 30 minutes, sulfuric acid was added, and the pH was adjusted until the pH was stabilized to 4. The PHA aqueous suspension liquid thus obtained was fed to an atomizer using a Mobile Minor spray dryer manufactured by Niro, and spray-drying was performed. The thermal stability of the PHA powder obtained by spray-drying was confirmed by the above method.

The above results are shown in Table 1.

TABLE 1

| No. | PHA aqueous suspension liquid | | | PVA | | | Propriety of spray-drying | Thermal stability |
|---|---|---|---|---|---|---|---|---|
| | Residual protein content [ppm] | Solid content concentration [%] | pH [—] | Addition amount [phr] | Average polymerization degree [—] | Saponification degree [mol %] | | |
| Example 1 | 5490 | 31 | 4 | 2.5 | 500 | 80 | Very good | Good |
| Example 2 | 5490 | 31 | 4 | 2.5 | 500 | 85 | Very good | Good |
| Example 3 | 5490 | 31 | 4 | 2.5 | 500 | 88 | Very good | Good |
| Example 4 | 5490 | 31 | 4 | 2.5 | 2000 | 80 | Very good | Good |
| Example 5 | 5490 | 31 | 4 | 2.5 | 2400 | 80 | Good | Good |
| Comparative Example 1 | 5490 | 31 | 4 | 0 | — | — | Poor | — |
| Comparative Example 2 | 5490 | 31 | 11 | 0 | — | — | Very good | Poor |
| Example 6 | 1030 | 53 | 4 | 0.75 | 500 | 88 | Good | Good |
| Example 7 | 1030 | 53 | 4 | 1 | 500 | 88 | Very good | Good |
| Example 8 | 1030 | 53 | 4 | 1.5 | 500 | 88 | Very good | Good |
| Example 9 | 1030 | 53 | 4 | 2.5 | 500 | 88 | Very good | Good |
| Comparative Example 3 | 1030 | 53 | 4 | 0 | — | — | Poor | — |
| Example 10 | 990 | 53 | 4 | 1.5 | 500 | 43 | Very good | Good |
| Example 11 | 990 | 53 | 4 | 1.5 | 500 | 50 | Very good | Good |
| Example 12 | 990 | 53 | 4 | 1.5 | 500 | 73 | Very good | Good |
| Example 13 | 990 | 53 | 4 | 1.5 | 500 | 80 | Very good | Good |
| Example 14 | 990 | 53 | 4 | 1.5 | 500 | 87 | Very good | Good |

TABLE 1-continued

|  | PHA aqueous suspension liquid | | | PVA | | | |
|---|---|---|---|---|---|---|---|
| No. | Residual protein content [ppm] | Solid content concentration [%] | pH [—] | Addition amount [phr] | Average polymerization degree [—] | Saponification degree [mol %] | Propriety of spray-drying | Thermal stability |
| Example 15 | 990 | 53 | 4 | 1.5 | 400 | 87 | Very good | Good |
| Example 16 | 990 | 53 | 4 | 1.5 | 600 | 87 | Very good | Good |
| Example 17 | 990 | 53 | 4 | 1.5 | 1700 | 87 | Very good | Good |
| Example 18 | 990 | 53 | 4 | 1.5 | 2100 | 87 | Very good | Good |
| Example 19 | 990 | 53 | 4 | 1.5 | 2400 | 87 | Very good | Good |
| Example 20 | 990 | 53 | 4 | 1.5 | 2600 | 87 | Very good | Good |

The invention claimed is:

1. An aqueous suspension liquid, comprising:
a polyhydroxyalkanoic acid; and
a polyvinyl alcohol,
wherein the aqueous suspension liquid has a pH of 5 or less;
a concentration of the polyhydroxyalkanoic acid in the aqueous suspension liquid is from 30% by weight to 65% by weight, and
a protein content in the aqueous suspension liquid is 30,000 ppm or less per weight of the polyhydroxyalkanoic acid.

2. The aqueous suspension liquid according to claim 1, wherein the concentration of the polyhydroxyalkanoic acid in the aqueous suspension liquid is from 40% by weight to 60% by weight.

3. The aqueous suspension liquid according to claim 1, wherein an amount of the polyvinyl alcohol is from 0.1 to 20 parts by weight based on 100 parts by weight of the polyhydroxyalkanoic acid.

4. The aqueous suspension liquid according to claim 1, wherein an amount of the polyvinyl alcohol is from 0.5 to 10 parts by weight based on 100 parts by weight of the polyhydroxyalkanoic acid.

5. The aqueous suspension liquid according to claim 1, wherein an amount of the polyvinyl alcohol is from 0.75 to 5 parts by weight based on 100 parts by weight of the polyhydroxyalkanoic acid.

6. The aqueous suspension liquid according to claim 1, wherein the polyhydroxyalkanoic acid comprises poly-3-hydroxybutyrate-co-3-hydroxyhexanoate.

7. The aqueous suspension liquid according to claim 6, wherein the poly-3-hydroxybutyrate-co-3-hydroxyhexanoate has a 3-hydroxyhexanoate unit ratio of from 1 to 25 mol % relative to the sum total of the entire monomer units being 100 mol %.

8. The aqueous suspension liquid according to claim 1, wherein the polyvinyl alcohol has an average polymerization degree of from 200 to 2,400.

9. The aqueous suspension liquid according to claim 1, wherein the polyvinyl alcohol has an average polymerization degree of from 500 to 2,000.

10. The aqueous suspension liquid according to claim 1, wherein the polyvinyl alcohol has a saponification degree of from 35 mol % to 99.9 mol %.

11. The aqueous suspension liquid according to claim 1, wherein the polyvinyl alcohol has a saponification degree of from 50 mol % to 98.5 mol %.

12. The aqueous suspension liquid according to claim 1, wherein the polyvinyl alcohol has a saponification degree of from 80 mol % to 95 mol %.

13. The aqueous suspension liquid according to claim 1, wherein a protein content in the aqueous suspension liquid is 7,500 ppm or less per weight of the polyhydroxyalkanoic acid.

14. The aqueous suspension liquid according to claim 1, wherein the polyhydroxyalkanoic acid in the aqueous suspension liquid has a volume average particle diameter of 50 times or less a volume average particle diameter of primary particles of the polyhydroxyalkanoic acid.

15. The aqueous suspension liquid according to claim 1, wherein the aqueous suspension liquid has a pH of at least 1.

16. The aqueous suspension liquid according to claim 1, wherein the aqueous suspension liquid has a pH of 4 or less.

17. A method for producing the aqueous suspension liquid according to claim 1, the method comprising:
adding a polyvinyl alcohol to an aqueous suspension liquid comprising a polyhydroxyalkanoic acid; and
adjusting a pH of the aqueous suspension liquid comprising the polyhydroxyalkanoic acid to 5 or less.

18. The method according to claim 17, wherein the adjusting a pH is carried out after the adding.

19. The method according to claim 17, wherein the adjusting a pH is carried out by adding an acid to the aqueous suspension liquid comprising the polyhydroxyalkanoic acid.

* * * * *